Aug. 28, 1923.
W. B. EDDISON
1,466,356
METHOD OF AND APPARATUS FOR MIXING AND PROPORTIONING GASES
Filed June 14, 1921
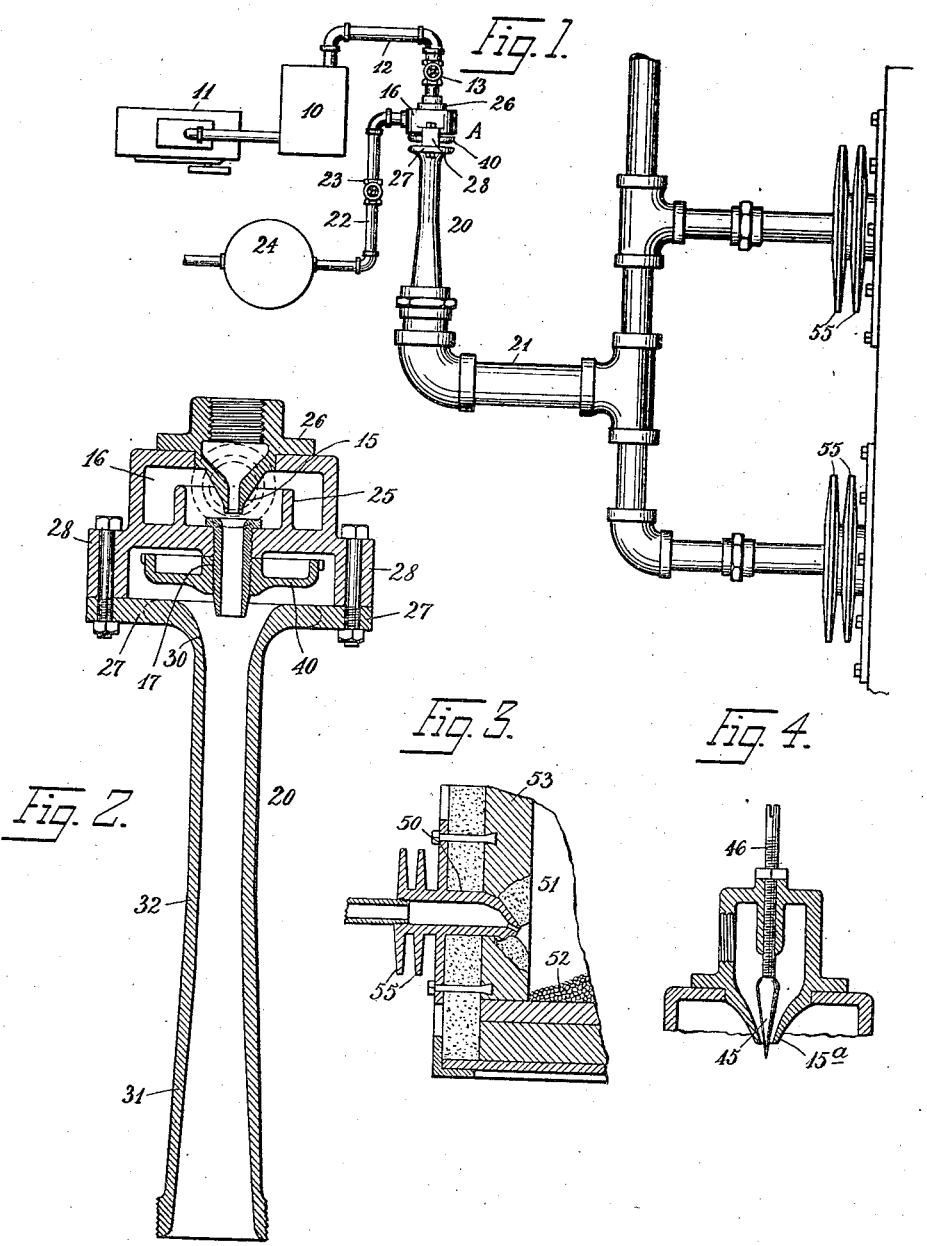
INVENTOR.
William Barton Eddison
BY
ATTORNEY.

Patented Aug. 28, 1923.

1,466,356

UNITED STATES PATENT OFFICE.

WILLIAM BARTON EDDISON, OF IRVINGTON, NEW YORK, ASSIGNOR TO THE SURFACE COMBUSTION CO., INCORPORATED, OF NEW YORK, N. Y., A CORPORATION OF NEW YORK.

METHOD OF AND APPARATUS FOR MIXING AND PROPORTIONING GASES.

Application filed June 14, 1921. Serial No. 477,519.

*To all whom it may concern:*

Be it known that I, WILLIAM BARTON EDDISON, a citizen of the United States, residing at Irvington, in the county of Westchester and State of New York, have invented certain new and useful Improvements in Methods of and Apparatus for Mixing and Proportioning Gases, fully described and represented in the following specification and the accompanying drawings, forming a part of the same.

This invention relates to a method and apparatus for producing and supplying an explosive gaseous mixture of fuel gas and air for combustion.

The invention has been made especially with the idea of providing an improved method and apparatus for supplying an explosive mixture of fuel gas and air to the burner discharge orifices of a surface combustion furnace at a pressure above a predetermined minimum and in quantities variable at will without changing the proportions of the constituent gases, that is, to meet the conditions of constant proportions, variable quantity, and exit pressure sufficient to prevent backflashing.

In producing and supplying an explosive mixture of fuel gas and air for combustion by causing a jet of one of the constituent gases to induce a flow of the required proportionate quantity of the other constituent gas, it is in many cases desirable to employ air supplied under a suitable pressure as the driving or inducing gas, the pressure energy of the air serving to inspirate fuel gas supplied from a suitable source, as from an ordinary distribution line. Apparatus heretofore used for this purpose is very sensitive, requiring for the necessary maintenance of constant proportions of fuel gas and air in the mixture under operating conditions and especially in the lower part of the range of quantity of mixture supply, very exact construction and relative proportioning of parts of the apparatus and a very accurate control of the supply pressure of the fuel gas with relation to the internal furnace pressure, or pressure against which the mixture is discharged, or other factor controlling the burner resistance, or back pressure on the out-flowing mixture.

The present invention aims to minimize the effect on the mixture proportionality of variation in resistance to outflow of the mixture and of gas pressure variation, and to increase the permissible latitude in size ratios between the flow controlling parts of the apparatus. The invention also has the advantage of reducing the amount of pressure air required and of making of less effect slight inaccuracies in the apparatus.

The invention comprises a method wherein a mixture of fuel gas with less than the required proportionate amount of air is first formed by the entraining action of a high velocity jet of air, and the velocity energy of the mixture thus formed is then utilized to entrain additional air to form a mixture of the required proportions. The pressure air is at a higher pressure than is used when the driving jet of air supplies the whole amount of air in the mixture, and the suction of the inducing jet of air is greatly increased.

A full understanding of the invention can best be given by a detailed description of an approved form of apparatus embodying the apparatus features of the invention and adapted for carrying out the method, and of the operation thereof, and such a description will now be given in connection with the accompanying drawings showing such an apparatus and in which:—

Fig. 1 is a plan view showing the apparatus and a part of a furnace to which the apparatus is attached;

Fig. 2 is a longitudinal sectional view of the inspirator on a larger scale;

Fig. 3 is a broken sectional view of a part of the furnace showing one of the burner tubes in section; and Fig. 4 is a sectional view of a modified form of pressure air nozzle.

Referring to the drawings, the air which is to serve as the driving or inducing gas is supplied to the inspirator A under a suitable pressure from a source of supply such as the supply tank 10 in which the desired pressure is maintained, as shown in Fig. 1, by a blower or compressor 11. The air is supplied through a supply pipe 12 to the air nozzle 15, the supply pipe being provided with a valve 13 for varying the quantity of mixture produced by varying the supply of the pressure air. The nozzle 15 extends into a gas chamber 16 and discharges into an entraining tube 17 which extends through the wall of the gas chamber and discharges into the entrance cone of a second entraining tube which, when the mixture is to be supplied to more than one burner nozzle or to a single burner nozzle at some distance from the end of the entraining tube, forms the throat of a Venturi tube 20. From the end of the discharge cone of the Venturi tube a delivery pipe 21 leads to the burner nozzles or mixture discharge orifices.

The fuel gas is supplied to the chamber 16 through a supply pipe 22 provided with a shut-off valve 23 from a suitable source of supply such as a service distribution line, and in order that the gas may be supplied to the inspirator at a pressure sufficiently low so that the flow of the gas into the entraining tube 17 shall be by reason of the inducing and entraining action of the air jet from the nozzle 15 rather than because of gas pressure in the chamber 16, and also to eliminate variations in line pressure, a pressure governor 24 is provided to reduce the gas pressure and hold it approximately constant. The best results with the pressure air at a pressure of not more than 15 pounds have been secured with the gas supplied to the chamber 16 at a pressure approximately atmospheric pressure, and preferably slightly below atmospheric pressure, and this has the additional practical advantage that gas will not flow into the inspirator or escape when the inspirator is not in operation. A pressure governor of any suitable construction may be used. When the entraining tube 17 is set with its entrance end close to the wall of the gas chamber, as in the construction shown, a shield or baffling flange 25 surrounding the end of the entraining tube is provided to insure an even flow of the gas from all sides into the entraining tube.

The orifice of the air nozzle 15 should be of such form as to give the air jet as much velocity energy as possible, and should, therefore, have a suitably rounded entrance followed by a straight or approximately straight run of a length equal to or somewhat greater than its diameter, that is, sufficient to properly direct and form the jet. For air supply pressures in excess of about 15 pounds, a nozzle with a suitably flared orifice should, of course, be used. For convenience in manufacture and to permit ready change of the air nozzle as desired, a removable nozzle piece 26 is provided which is secured to the wall of the gas chamber with the nozzle extending through an opening in the wall, the nozzle piece being provided with a flange as shown by which it may be bolted to the wall of the gas chamber, or being otherwise secured. The first entraining tube 17 also has a suitably rounded entrance and is of sufficient length, most desirably several times its diameter, to secure efficient entraining action. The rounded entrance portion of the entraining tube should be short as shown, and the end of the air nozzle should be set close to the plane of the end of the tube, and the outside of the nozzle end should be formed so as not to interfere with the flow of gas into the tube. The relative size or cross-area of the entraining tube and nozzle orifice will depend on the pressure of the pressure air and the desired proportionate amounts of fuel gas and air in the mixture formed in the first entraining tube, and may be readily determined by trial. The entraining tube is also most desirably made removable, as by being shouldered at its entrance end and threaded to screw into a tapped hole in the wall of the gas chamber. By first removing the nozzle piece 26, access may be readily had for setting or removing the entraining tube.

The Venturi tube 20 is positioned to receive the jet of primary mixture discharged from the tube 17, the casing forming the gas chamber and the entrance end of the Venturi tube being connected in the construction shown by bolts extending through lugs 27 projecting from the end of the Venturi tube and spacing lugs 28 on the chamber casing.

In order that approximately constant proportions of fuel gas and air in the mixture may be maintained under variations in quantity of mixture delivered, the Venturi tube should have its entrance cone and its expanding portion or discharge cone of such limited angles between their sides that the gaseous mixture will hug the sides of the discharge cone and maintain the position of the limit of minimum jet cross-section stationary in the throat of the tube, and that the desired rise in pressure will be developed and the necessary change of velocity energy back into pressure energy effected without excessive friction losses. The tube most desirably has between its entrance cone 30 and its discharge or pressure cone 31 an elongated entraining and velocity-equalizing throat 32 the sides of which are approximately parallel and the length of which is sufficient to substantially equalize the velocities across the stream, as described in U. S. Patent No. 1,295,086, dated February 18, 1919. With a tube of this kind an increased entraining or driving action by the jet from the tube 17 is secured and also a more efficient transformation of velocity energy back into pressure energy. The general efficiency of the apparatus is thus increased and also the range of variation in the amount of mixture that may be supplied and discharged through a given area of burner discharge orifice or orifices at the desired velocity.

The end of the entrance cone 30 of the Venturi tube is spaced off from the gas chamber casing sufficiently to permit air from the surrounding atmosphere to flow freely into the entrance cone except as it may be restricted by the adjustable shutter provided for adjustment of proportions and for closing the Venturi tube to the atmosphere when the inspirator is not in operation. The end of the entraining tube 17 extends close to, or most desirably and as shown slightly beyond, the plane of the end of the entrance cone of the Venturi tube. The relative size or cross-area of the first entraining tube 17 and of the Venturi throat, or second entraining tube, 20 will vary according to the proportions of primary mixture from the tube 17 and additional air in the mixture to be produced, and may be readily determined by trial. As an example of suitable proportions of the pressure air nozzle, entraining tube 17 and Venturi throat, an inspirator for producing and supplying an explosive mixture of air and fuel gas in proportions of about 6 to 1 by volume at about 6" water pressure to a surface combustion furnace and to be operated by pressure air supplied at 9½ pounds, has a throat of ⅜" diameter, an entraining tube 17 of ¼" diameter, and a pressure air nozzle of .14" in diameter. Such an inspirator supplies mixture at the desired 6" water pressure to burners having an aggregate burner orifice of 90% to 110% of the throat area. With such an apparatus the pressure air provides about 22% of the air entering the mixture, the remaining 78% of the air in the mixture being drawn from the atmosphere.

The inspirators are made with their parts proportioned according to the character of fuel gas and other conditions of use to produce a mixture of approximately the required proportions, and adjustment of proportions within limits may then be effected by changing the area of the pressure air nozzle or by suitably controlling the supply of air to the Venturi entrance cone. An adjustable shutter for controlling the supply of air to the Venturi entrance cone is shown in Figs. 1 and 2 formed by a disk 40 mounted to turn on the threaded tube 17 so as to be thereby adjusted toward or away from the end of the entrance cone to vary the width of the air entrance slot between the disk or shutter and the edge of the cone. By adjusting the shutter toward the cone, the flow of air into the cone is restricted and a smaller proportionate amount of air enters the Venturi throat with the primary mixture from the tube 17. The shutter 40 also serves, when completely closed, to prevent back-draft from the furnace chamber through the inspirator when the fuel gas and pressure air are also shut off.

In order to reduce so far as possible the dimensions of the shutter 40 and the entrance end of the Venturi tube, while providing for the necessary flow of air into the tube, the outer or edge portion of the Venturi entrance cone and the shutter are so shaped as to secure a stream line flow and gradual acceleration of the air entering the tube. This result is best secured by suitably rounding away the edges of both the entrance cone and the shutter and shaping the central portion of the shutter about the tube 17 to extend toward the Venturi throat somewhat with a suitably curved surface as, for example, as shown. The flow of air into the Venturi entrance cone will thus be controlled according to the flow law of orifices, the entrance space between the edge portions of the Venturi entrance cone and the shutter serving as an inlet orifice having a constant coefficient.

Change in air nozzle orifice area for adjusting mixture proportions may be effected by substitution of nozzles, or a nozzle having an adjustable outlet area may be used. Such a nozzle suitable for the purpose is shown in Fig. 4. The area of the outlet orifice of the nozzle 15$^a$ shown in this figure may be varied by adjusting the position of a tapered needle or valve piece 45 carried by a threaded stem 46.

The inspirating apparatus is shown in Fig. 1 as connected to supply a plurality of burner nozzles or mixture discharge tubes 50 of an impact-jet surface combustion furnace for burning explosive gaseous mixtures according to the method of U. S. Patent No. 1,146,724, granted on application of Dr. Charles E. Lucke. The furnace, a broken section of which is shown by Fig. 4, comprises a structure providing a furnace chamber 51 provided with a porous and permeable combustion supporting bed 52 of refractory material against which jets of the explosive mixture are directed from the nozzles 50 set in the furnace wall 53. The jet of mixture, moving with a velocity in excess of the rate of propagation of inflammation of the mixture, strikes against the combustion bed, the mixture being thereby deflected and caused to spread out with rapid loss of flow velocity and burning at the surface of or within the bed as described in said patent.

In order that the proportionality of the mixture may be maintained under variation in the quantity supplied, each of the burner nozzles is formed with a discharge orifice of substantially constant coefficient form, and the connecting passage between such burner orifices and the Venturi tube, that is, the passage through the burner nozzles and connecting piping are of such relatively large size that there will be no or substantially no pipe resistance to affect the flow of the mixture. The flow of the gases into the entraining throat 17 and into the Venturi tube and the flow of the mixture will thus be controlled according to the flow law of orifices, and whatever velocity and pressure changes take place will be according to the flow law of orifices, and not by reason of pipe, bend or eddy current losses.

Inspirating apparatus heretofore used for producing an explosive mixture of fuel gas and air in which the total quantity of one of the constituent gases of the mixture serves as the driving or inducing gas and all of the other constituent gas is entrained, has the disadvantage that variation in the resistance to outflow of the mixture affects the richness of the mixture or relative proportions of fuel gas and air in the mixture. With such a single-stage apparatus in which the air supplied under pressure serves as the driving gas an increase in resistance to outflow of the mixture causes the mixture to become leaner. With such an apparatus in which the fuel gas supplied under pressure serves as the driving or inducing gas, an increase in resistance to outflow of the mixture causes the mixture to become richer, although the effect upon proportionality of the fuel gas and air in the mixture is not so great as in the case of the single-stage apparatus in which the air, which enters the mixture in the greater proportionate amount, serves as the driving gas. In using such apparatus to supply an explosive mixture directly for combustion in a furnace, increase in resistance to outflow of the mixture may result from increase in the internal furnace pressure or from heating of the mixture in the burner nozzles because of the nozzles becoming highly heated. Such heating of the mixture in the burner nozzles, which is also objectionable because of its reducing the amount of mixture flowing from the nozzle under the available pressure, may be avoided by using burner nozzles having an approximately constant pressure-capacity characteristic, this characteristic of the nozzles being secured by forming the nozzles so that the walls of the discharge passage shall be prevented from becoming excessively heated in operation. This is accomplished in the burner nozzles shown in the drawings by having the nozzle formed and set in the furnace wall so that only a portion of the end or the nose of the nozzle is exposed directly to the furnace heat, the balance thereof being protected by the surrounding wall of poor heat-conducting material, and by forming the nozzle of a body of metal of sufficient continuous mass to rapidly conduct away to the outer portions of the nozzle body or tube such heat as is absorbed by the nozzle, and by forming or providing the outer end of the nozzle tube with means for discharging the heat, such as the heat discharging fins or plates 55.

One of the advantages of the present invention is that the proportions or richness of the mixture may be maintained approximately constant under variation in resistance to outflow of the mixture. This results from the fact that both the fuel gas and a part of the air are entrained. In single-stage inspirators, as above pointed out, increase in resistance to outflow of the mixture causes a reduction in the proportionate amount of the entrained gas in the mixture, that is, a reduction in the amount of fuel gas when the air serves as the driving gas, and a reduction in the amount of air when the fuel gas serves as the driving gas, the effect on the proportions of fuel gas and air in the mixture being therefore greater with the apparatus in which the air serves as the driving gas since in such case the proportionate amount of the entrained gas, that is, the fuel gas, is relatively small. With the apparatus of the present invention, and in producing a fuel gas and air mixture according to the method of the present invention, when increase in resistance to outflow causes a reduction in the relative amount of fuel gas entering the mixture there is also a reduction in the amount of the entrained air entering the mixture, and as only part of the air which enters the mixture is entrained, the effect of the outflow resistance variation on the entraining of the fuel gas and of a part of the air entering the mixture may be such that the proportions of air and fuel gas in the mixture will remain constant under variation in outflow resistance, or the mixture may become slightly richer or slightly leaner with increase in outflow resistance according to the proportionate amount of air which is entrained as compared to the amount supplied by the driving jet. If the proportionate amount of entrained, or secondary, air is sufficiently great, the mixture will get leaner with increased outflow resistance; and if the proportionate amount of secondary air is sufficiently small, the mixture will get richer with increased outflow resistance.

The apparatus shown may be readily proportioned to cause any desired proportionate amount of the total air entering the mixture to be entrained into the second entraining tube, or throat of the Venturi tube; and the proper proportionate amount of such secondary air required for causing the mixture to be maintained approximately constant under variations in outflow resistance or to become slightly richer or slightly leaner with increase in outflow resistance may be readily determined by trial. In general, increasing the cross-area of the second entraining tube, or Venturi throat, and decreasing the cross-area of the first entraining tube and of the pressure air nozzle increases the proportionate amount of secondary air in the mixture; but, of course, the relative sizes of the air nozzle orifice, first entraining tube, second entraining tube, or Venturi throat, and aggregate burner orifice must also be such as to give the desired proportion of fuel gas and air in the mixture. This may also be readily determined and adjusted, as hereinbefore pointed out. Adjustment of the shutter 40 will also vary the proportionate amount of secondary air in varying the ratio of total air to the fuel gas. By suitably proportioning the primary nozzle and the first entraining tube, both relatively to each other and to the second entraining tube, or Venturi throat, and burner orifices, the air-gas ratio may be made to remain approximately constant with variation in outflow resistance through a very considerable range or to become richer or leaner with increased outflow resistance as desired.

In furnace operation, if there is any change in air-gas ratio with change in outflow resistance, it is desirable that the mixture should become slightly richer with increase in outflow resistance rather than that it should become leaner. It is in many cases desirable, therefore, in forming an explosive mixture according to the method of the present invention that the proportionate amount of secondary air entrained by the primary mixture should be such that an increase in resistance to outflow will cause a slight increase in richness of the mixture, and the apparatus is desirably in many cases proportioned to secure this result.

For example, with an apparatus such as shown having a pressure air nozzle orifice of .673 inch diameter, an entraining tube of .813 inch diameter, and a Venturi throat of 1.25 inch diameter, increase in outflow resistance will result in slightly increased richness of the mixture, the mixture proportions being held very closely, however. With a variation in outlet orifice area from 2 to 2.7 sq. in., which is equivalent to a variation of outflow resistance over a considerable range, proportions varied from approximately 8.8:1 to 8.98:1 with a gas of unit density.

High efficiency of the apparatus in entraining and pressure building gives considerable latitude with regard to the aggregate burner discharge orifice area which may be employed with a given throat area of the Venturi tube. Of course, the area of burner discharge orifice with a Venturi apparatus as shown must not be so great as to prevent the building up of the necessary mixture pressure for causing the required excess velocity of discharge from the nozzle, or as to unduly limit the range of quantity control; and on the other hand, the burner discharge orifice area must not be so small as to prevent sufficient pressure reduction at the Venturi throat and cause too great a resistance to flow in the throat for the desired proportionate flow of air to take place. Also, too great an aggregate burner discharge area or too small an aggregate burner discharge area would limit the range of mixture quantity variation within which mixture can be efficiently supplied within the desired range of mixture supply pressure and without loss of proportionality of the constituent gases. One great advantage of the present construction, however, over the old type of pressure-air mixing apparatus in which the driving jet of air supplies the whole amount of air in the mixture is that this apparatus gives a much greater latitude in the ratio of aggregate burner discharge orifice area to throat area without loss of efficiency and maintenance of proportionality through a desired range of mixture supply variation. In practice it is found desirable that the area of the Venturi throat should be from about 90% to about 110% of the aggregate burner orifice area, whereas with the old form of pressure air inspirating apparatus in which the driving jet of air supplies the whole amount of air in the mixture, the Venturi throat area should be from about 45% to about 50% of the burner orifice area for maintaining proportions under an equal range of mixture quantity variation. Adjustment, as by means of the shutter 40 in the construction shown in Figs. 1 and 2, or by change or adjustment of the pressure air nozzle, must, of course, be made for the particular ratio between Venturi throat area and burner orifice area, since any substantial change in this ratio changes the proportionality of the mixture.

This relatively greater permissible variation in aggregate burner discharge orifice area for a given throat area has great practical advantage in obviating the necessity of machining and exact sizing of either the Venturi throat or the burner nozzle orifices, permitting also the use of stock sizes of Venturi tubes in apparatus of which the aggregate burner orifice areas vary within the limits imposed by the ratio limits above noted. The ratio limits above stated are to be understood as purely arbitrary and given merely as safe limits desirably observed in practice for highly efficient results, and they may be substantially increased with corresponding decrease in efficiency. A further practical advantage of the present apparatus, permitting the use of stock parts to an extent not possible with the old form of pressure air inspirators used for similar purposes, results from the fact that pressure air may be employed under widely varying maximum pressures with the same apparatus except for substitution of suitably sized pressure air nozzles and of different sized entraining tubes 17. The higher the air pressure used for supplying mixture under any desired pressure to the burner orifices the smaller will be the size of the air pressure nozzle for any given mixture proportions. The higher the air pressure and the smaller the air nozzle, the lower the proportionate quantity of pressure air used.

In the operation of the apparatus, the pressure air being supplied under suitable pressure and the apparatus being adjusted to secure the desired proportions for any mixture flow rate, then the amount of mixture supplied may be varied as desired within the working limits of the apparatus by adjusting the air control valve 13. With the opening and closing of the air control valve, permitting more or less pressure air to flow, the gas flow into the entraining tube 17 and the atmospheric air flow into the Venturi throat increase and decrease proportionately, and the final delivery pressure of the mixture to the burner orifices rises and falls correspondingly, the quantity of mixture discharged from the burner orifices being thus varied but the proportionality of the mixture being maintained approximately constant.

By the term "surface combustion" as used herein is meant the combustion of an explosive gaseous mixture which is supplied at a velocity in excess of the rate of propagation of inflammation through the mixture so as to prevent back-flashing through the discharge nozzle or orifice, the mixture being then caused to spread out with rapid increase of its stream cross-section and consequent reduction of its flow velocity, and combustion taking place in a zone or surface at which the flow velocity of the mixture is equal to its rate of propagation of inflammation. While apparatus embodying the present invention is especially adapted for supplying explosive gaseous mixture to surface combustion furnaces, yet, as will be understood, the invention is not to be considered as limited to such use or such apparatus. The term "orifice" as used in the claims is to be understood to mean an opening which is restricted as compared to the adjacent flow passage or space and so formed as to control the flow of gas therethrough according to the typical flow law of orifices $(V=C\sqrt{2gh})$, true when the pressure or head $h$ is not too large, and an orifice having a constant coefficient, or a constant coefficient orifice, is to be understood to be an orifice the coefficient of discharge of which is approximately constant within the normal working range of the apparatus, or for which the area of the contracted vein of the jet is itself constant. It is desirable that the coefficient of the orifices controlling the flow of fuel gas and of atmospheric air to the Venturi throat and of the mixture should be approximately 100%.

What is claimed is:

1. The method of supplying an explosive mixture of fuel gas and air in approximately constant proportions, which comprises forming a mxture of fuel gas with less than the required proportionate amount of air by the inducing and entraining action of a high velocity jet of air, and utilizing the velocity energy of the mixture thus formed to entrain additional air to form an explosive mixture of the desired proportions.

2. The method of supplying an explosive mixture of fuel gas and air in approximately constant proportions, which comprises forming a mixture of fuel gas with less than the required proportionate amount of air by the inducing and entraining action of a high velocity jet of air, utilizing the velocity energy of the mixture thus formed to entrain additional air to form an explosive mixture of the desired proportions, and varying the quantity of mixture supplied without changing the ratio of its component portions by varying the amount of air flowing in the high velocity jet.

3. The method of supplying an explosive mixture of fuel gas and air in approximately constant proportions, which comprises forming a mixture of fuel gas with less than the required proportionate amount of air by the inducing and entraining action of a high velocity jet of air, and utilizing the velocity energy of the mixture thus formed to entrain additional air to form an xplosive mixture of the desired proportions, the proportionate amount of additional air entrained by the primary mixture being such that a substantial variation within limits in resistance to outflow of the final mixture causes substantially no change in the richness of the mixture.

4. The method of supplying an explosive mixture of fuel gas and air in approximately constant proportions, which comprises forming a mixture of fuel gas with less than the required proportionate amount of air by the inducing and entraining action of a high velocity jet of air, and utilizing the velocity energy of the mixture thus formed to entrain additional air to form an explosive mixture of the desired proportions, the proportionate amount of additional air entrained by the primary mixture being such that an increase within lmits in resistance to outflow of the final mixture causes a slight increase in the richness of the mixture.

5. The method of supplying an explosive mixture of fuel gas and air to a furnace in approximately constant proportions, which comprises forming a mixture of fuel gas with less than the required proportionate amount of air by the inducing and entraining action of a high velocity jet of air on fuel gas supplied at a uniform pressure, utilizing the velocity energy of the mixture thus formed to entrain additional air to form an explosive mixture of the desired proportions, and discharging the explosive mixture thus formed into a furnace, the proportionate amount of additional air entrained by the primary mixture being such that a substantial variation within limits in the resistance to the flow of the final mixture into the furnace causes substnaitally no change in the richness of the mixture.

6. The method of supplying an explosive mixture of fuel gas and air to a furnace in approximately constant proportions, which comprises forming a mixture of fuel gas with less than the required proportionate amount of air by the inducing and entraining action of a high velocity jet of air on a supply of fuel gas maintained at a uniform pressure, utilizing the velocity energy of the mixture thus formed to entrain additional air to form an explosive mixture of the desired proportions, and discharging the explosive mixture thus formed into a furnace, the proportionate amount of additional air entrained by the primary mixture being such that an increase within limits in the resistance to the flow of the final mixture into the furnace causes a slight increase in the richness of the mixture.

7. The method of supplying a mixture of fuel gas and air in approximately constant proportions, which comprises forming a mixture of fuel gas with an amount of air greater than the amount of fuel gas by the inducing and entraining action of a high velocity jet of air on fuel gas supplied at a lower and substantially constant pressure, and utilizing the velocity energy of the mixture thus formed to entrain additional air materially greater in amount than the amount of air introduced in the high velocity jet.

8. Apparatus for producing and supplying an explosive mixture of fuel gas and air in approximately constant proportions, comprising, in combination a nozzle for discharging a high velocity jet of air, an unobstructed entraining tube into which the jet of air is discharged having a flaring entrance and a straight portion of uniform cross-section, means for supplying fuel gas at a relatively low and substantially constant pressure to the entrance of said entraining tube, and a second entraining tube mounted with its entrance cone in position to receive the jet of mixture from the first said entraining tube to combine additional air therewith to form a mixture of the desired proportions.

9. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low and substantially constant pressure to the entrance of said entraining tube, and a second entraining tube mounted with its entrance cone in position to receive the jet of mixture from the first said entraining tube to combine additional air therewith to form a mixture of the desired proportions, said nozzle and entraining tubes being of such relative cross-areas that a substantial variation within limits in resistance to outflow of the mixture causes substantially no change in the richness of the mixture.

10. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low and substantially constant pressure to the entrance of said entraining tube, and a second entraining tube mounted with its entrance cone in position to receive the jet of mixture from the first said entraining tube to combine additional air therewith to form a mixture of the desired proportions, said nozzle and entraining tubes being of such relative cross-areas that an increase within limits in resistance to outflow of the mixture causes a slight increase in the richness of the mixture.

11. Apparatus for producing and supplying an explosive mixture of fuel gas and air in approximately constant proportions, comprising in combination a nozzle for discharging a high velocity jet of air, an unobstructed entraining tube into which the jet of air is discharged having a flaring entrance and a straight portion of uniform cross section, means for supplying fuel gas at a relatively low and substantially constant pressure to the entrance of the entraining tube, a Venturi tube mounted with its entrance cone in position to receive the jet of mixture from said entraining tube to combine additional air therewith and to deliver the resulting mixture at the desired pressure and a closed conduit connecting the end of the pressure cone of said Venturi tube to a furnace.

12. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low and substantially constant pressure to the entrance of the entraining tube, and a Venturi tube mounted with its entrance cone in position to receive the jet of mixture from said entraining tube to combine additional air therewith and to deliver the resulting mixture at the desired pressure, said nozzle and entraining tube and the throat of the Venturi tube being of such relative cross-area that a substantial variation within limits in resistance to outflow of the mixture causes substantially no change in the richness of the mixture.

13. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low and substantially constant pressure to the entrance of the entraining tube, and a Venturi tube mounted with its entrance cone in position to receive the jet of mixture from said entraining tube to combine additional air therewith and to deliver the resulting mixture at the desired pressure, said nozzle and entraining tube and the throat of the Venturi tube being of such relative cross-area that an increase within limits in resistance to outflow of the mixture causes a slight increase in the richness of the mixture.

14. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low pressure to the entrance of the entraining tube, a Venturi tube mounted with its entrance cone in position to receive the jet of mixture from said entraining tube to combine additional air therewith and to deliver the resulting mixture at the desired pressure, means providing a circumferential inlet orifice through which air flows to the entrance cone of the Venturi tube, and means for varying the width of said inlet orifice for varying the proportions of fuel gas and air in the mixture.

15. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low pressure to the entrance of the entraining tube, a Venturi tube mounted with its entrance cone in position to receive the jet of mixture from said entraining tube to combine additional air therewith and to deliver the resulting mixture at the desired pressure, and a disc shutter adjustable toward and from the entrance cone of the Venturi tube to vary the supply of air to the entrance cone for varying the proportions of fuel gas and air in the mixture, the disc shutter being shaped to provide with the Venturi entrance cone a rounded entrance and a passage of gradually decreasing cross-area giving stream line flow and gradual acceleration of the entering air.

16. In an inspirator, the combination with an entraining tube and a nozzle for discharging a jet of the driving gas into the entrance cone of the entraining tube, of a disc shutter adjustable toward and from the entrance cone for controlling and varying the flow of the driven gas into the entrance cone, the disc shutter being shaped to provide with the entrance cone a rounded entrance and a passage of gradually decreasing cross-area giving stream line flow and gradual acceleration of the entering gas.

17. Apparatus for producing and supplying an explosive mixture of fuel gas and air in approximately constant proportions, comprising in combination a nozzle for discharging a high velocity jet of air, means for supplying air under pressure to said nozzle, an entraining tube into which the jet of air is discharged, means for supplying fuel gas at a relatively low and substantially constant pressure to the entrance of the entraining tube, a Venturi tube mounted with its entrance cone in position to receive the jet of mixture from said entraining tube, means for supplying additional air under atmospheric pressure to the entrance cone of said Venturi tube, means for varying the supply of pressure air to said nozzle in order to vary the quantity of mixture produced, and means for varying the amount of additional air supplied to the entrance cone of the Venturi tube in order to vary the proportions of fuel gas and air in the mixture.

18. Apparatus for producing and supplying an explosive mixture of fuel gas and air in approximately constant proportions, comprising in combination a nozzle for discharging a high velocity jet of air, an entraining tube into which the jet of air is discharged, means for supplying fuel gas at a relatively low pressure to the entrance of the entraining tube, and a Venturi tube mounted with its entrance cone in position to receive the jet of mixture from said entraining tube to combine additional air therewith and to deliver the resulting mixture at the desired pressure, the Venturi tube having between its entrance cone and its pressure cone an elongated smooth-walled entraining and velocity-equalizing throat the sides of which are approximately parallel and the length of which is several times as great as its diameter so as to substantially equalize the velocity across the stream.

19. Apparatus for producing and supplying an explosive mixture of fuel gas and air in approximately constant proportions, comprising in combination a fuel gas chamber having a gas inlet, an entraining tube having its entrance end open to the gas chamber and extending through a wall thereof, a nozzle set to discharge a driving jet of air into the entrance end of said entraining tube, and a Venturi tube connected to the gas chamber casing with its entrance cone in position to receive the jet of mixture from said entraining tube and spaced off from the gas chamber casing to permit flow of atmospheric air into the tube, and means between the gas chamber casing and the entrance cone of the Venturi tube and adjustable toward and from the entrance cone to vary the proportionate amount of air entering the tube.

20. Inspirating apparatus comprising a casing providing a gas chamber and having a gas inlet opening, an entraining tube having its entrance end open to the gas chamber and extending through and beyond a wall of the chamber casing and being externally screw threaded, a nozzle piece set in an opening in the opposite wall of the chamber casing with its nozzle orifice in position to discharge a driving jet of air into the entrance end of said entraining tube, a Venturi tube connected to the chamber casing with its entrance cone in position to receive the jet of mixture from said entraining tube and spaced off from the chamber casing to permit flow of atmospheric air into the tube, and an adjustable disc shutter mounted to turn on the threaded extending portion of said entraining tube opposite the entrance cone of the Venturi tube for controlling the flow of air into the tube.

In testimony whereof I have hereunto set my hand in the presence of two subscribing witnesses.

WILLIAM BARTON EDDISON.

Witnesses:
L. MENG,
H. M. BECK.